Aug. 16, 1966  E. HENRY-BIABAUD  3,266,336
MOTOR VEHICLE HEADLAMPS OF ADJUSTABLE INCLINATION
Filed April 10, 1964

Inventor: Edmond
Henry-Biabaud
By Wenderoth, Lind
and Ponack
Attorneys

United States Patent Office 3,266,336
Patented August 16, 1966

3,266,336
MOTOR VEHICLE HEADLAMPS OF ADJUSTABLE INCLINATION
Edmond Henry-Biabaud, Paris, France, assignor to Societe Anonyme Andre Citroen, Paris, France, a corporation of France
Filed Apr. 10, 1964, Ser. No. 358,884
Claims priority, application France, Apr. 12, 1963, 931,517, Patent 1,361,555
3 Claims. (Cl. 74—503)

This invention relates to a motor vehicle headlamp of adjustable inclination, and more particularly to a control mechanism of such a headlamp which permits either of retracting the latter into the bodywork of the vehicle for daytime driving or, when it is in the operative position, of adjusting its inclination, which is especially necessary on vehicles whose longitudinal attitude varies considerably with the load being carried.

Essentially, a motor vehicle headlamp according to the present invention, whose inclination is adjustable about a transverse axis of the vehicle and is controlled through the medium of a rod whose position is adjustable longitudinally of itself by the driver, is characterized in that said actuating rod is angularly rigid with, and slidable and axially latchable in at least two predetermined positions relative to, a sleeve having an external screw-thread thereon and which is engaged into a tapped bush fixedly secured to the vehicle, whereby sliding motion of the rod between its latching positions within said sleeve causes the headlamp to be moved from an operative position to a retracted position in the vehicle bodywork, or vice versa, while rotating motion of said rod enables complementary adjustments to be made to the inclination of the headlamp by movement of said threaded sleeve within and relative to said bush.

It goes without saying that in the usual case of motor vehicles fitted with two headlamps, the latter can be intercoupled in any known manner, thereby enabling a single control mechanism to be used.

This mechanism is manifestly noteworthy by its simplicity, having regard for the requirements it can satisfy.

An embodiment of the invention will now be more particularly described, by way of example, with reference to the accompanying drawing, in which.

Figure 1:
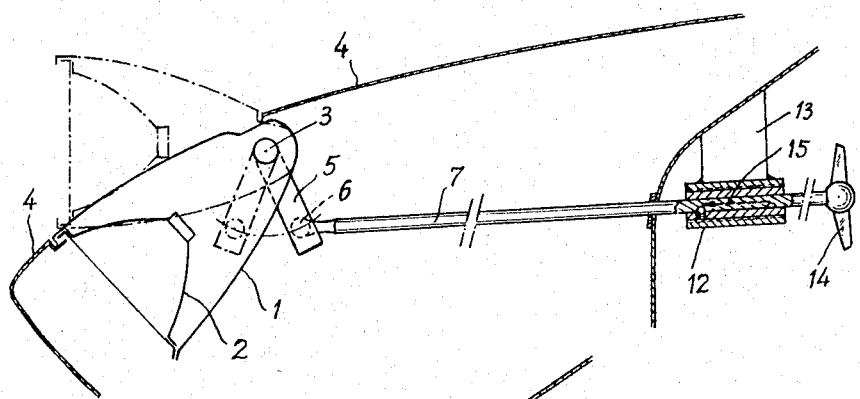
FIGURE 1 is a diagrammatic side elevation view of a retractable and adjustable headlamp arrangement, the control mechanism thereof being shown in partial section.

Reference to FIGURE 1 shows a motor vehicle headlamp arrangement wherein a headlamp shell 1 supporting the reflector unit 2 is pivotally mounted about a shaft 3 transverse to the vehicle and rigid with the bodywork thereof, whereby said headlamp may either be retracted into a portion of the bodywork designated by reference numeral 4 and consisting, say, of a low-slung wing, or else be moved into the operative position shown in dot-dash lines.

The arrangement referred to is common to both vehicle headlamps, the shells 1 of which are intercoupled, for instance, through the medium of the shaft 3 common thereto and with which they are angularly rigid. Keyed to shaft 3 is one end of an operating lever 5 whose other end is pivotally connected at 6 through a ball-and-socket joint to an actuating rod 7 extending into the interior of the vehicle where it is mounted to be adjustable longitudinally of itself by the driver.

The rod 7 is slidably mounted in a sleeve 8, being axially latchable therein in predetermined positions, such latching being obtained in this specific case by the cooperation of notches 9 formed on said rod with a restraining ball 10 which is lodged in said sleeve and urged by a spring 11 into pressure contact against the rod 7. Rod 7 is rendered angularly rigid with sleeve 8 through the medium of a square-section keyway, and sleeve 8 has an external screw-thread thereon and engages into a tapped bush 12 which is rigidly connected to the bodywork through a bracket 13 fixedly dependent from the scuttle through which rod 7 extends. The latter is fitted with a handle 14 on its extremity nearest to the driver.

Thus, by sliding the rod 7 between its latched position shown in solid lines in FIGURE 1 and the position reached by sliding said rod forwardly in the direction shown by arrow 15, the driver can swivel the headlamp from its retracted position shown in solid lines into its operative position shown in dot-dash lines, or vice versa. Moreover, in the latter-mentioned position, the height of the light beam can be correctly adjusted by rotating the handle 14 in one direction or the other, thereby also rotating the rod 7 and the sleeve 8 and consequently displacing them axially with respect to the fixed bush 12 by an amount dependent upon the pitch of the cooperating screw-threads of the sleeve and the bush, respectively.

Assuming, for instance, that only two possible latching positions are provided for rod 7 in sleeve 8, then it will be convenient to operate the headlamps in the following manner:

In order to obtain the operative position, first swivel the headlamps through the minimum distance provided by the sliding motion of rod 7 and then effect the complementary adjustment on the inclination of the light beam by rotating the rod 7 in a direction which may be pre-established as the clockwise direction.

In order to subsequently retract the headlamps, first slide the rod 7 back into its initial latching position and then rotate the rod 7 an anti-clockwise direction until the headlamps are fully home in their retracted position.

Figure 2:
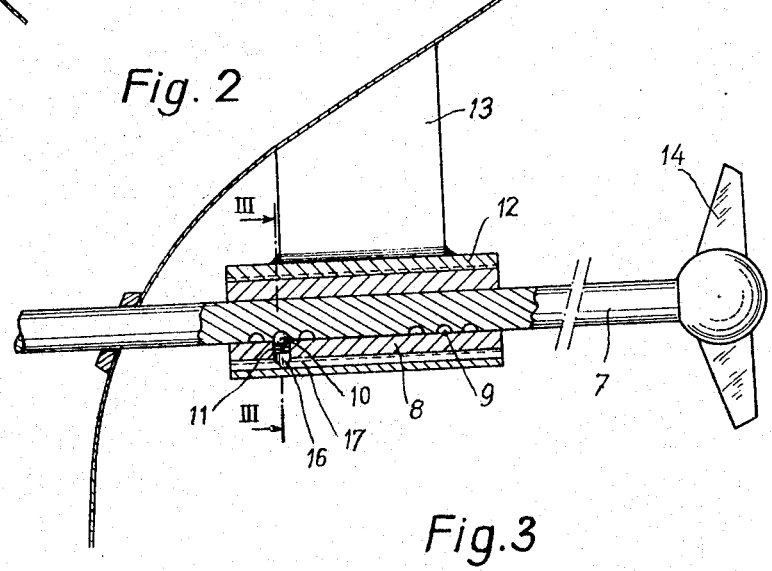
FIGURE 2 is a detail view on an enlarged scale of said control mechanism.

However, reference to FIGURE 2 shows that provision may alternatively be made for a plurality of stepped latching positions of the rod 7 in the region of the retracted and operative positions of the headlamps. Where this is the case, the control mechanism may be devised so that the pitch of the cooperating screw-threads of sleeve 8 and bush 12 is at least equal to the interval between two of the consecutive stepped positions referred to, in which specific case the control mechanism could be operated in the following manner:

The headlamps are swivelled into the operative position by sliding the rod 7, as nearly to the desired setting as is permitted by said stepped latching positions.

The complementary adjustment is then effected by rotating the rod 7, it being noted that by reason of the specific design feature hereinabove specified for the cooperating screw-threads of the sleeve and the bush, one half-turn at the most of the rod 7 and hence of the handle 14 will suffice to obtain the desired complementary correction.

In order to retract the headlamps, restore the handle 14 to its initial orientation (which may be chosen to be the vertical position, for example), and then slide the rod 7 which because of its length is somewhat flexible rearwardly into a latching position corresponding to retraction of the headlamps.

Figure 3:
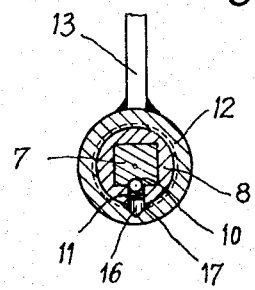
FIGURE 3 shows the control mechanism in cross section taken through the line III—III of FIGURE 2.

FIGURES 2 and 3 show that, in such a case, in order to permit sliding motion of rod 7 in sleeve 8 only when the handle 14 is in the vertical position, there may be associated with the ball 10, within the housing thereof formed in the sleeve and on that side of spring 11 which is remote from the ball, a locking plunger 16 which cooperates with an axial groove 17 formed in the fixed bush 12 and which thus interdicts axial movement of the rod 7, by preventing retraction of the ball 10 relative to the latter, as long as the plunger 16 has not engaged with the groove 17.

I claim:

1. An arrangement for a disappearing pivot headlight comprising a shaft upon which said headlight is mounted, said shaft being rotatably mounted in a vehicle, a link fixed to said shaft, an actuating rod pivotally connected to said link, a sleeve in which said rod is slidably and non-rotatably mounted, said sleeve having external screw threads thereon, a fixed bushing in which said screw threads are threaded, means for axially latching said rod to said sleeve in at least two predetermined positions, whereby upon a sliding motion of said rod actuated by the operator said rod will cause said headlight to move from an operative position to a retracted position within said vehicle or vice versa and a rotatable motion of said rod and sleeve will secure adjustments in the inclination of said headlight.

2. An arrangement as set forth in claim 1 wherein said means for latching said actuating rod comprises a plurality of stepped latching positions in said sleeve and said cooperating screw-threads of said sleeve and said bush have a pitch at least equal to the spacing between two consecutive stepped positions.

3. An arrangement as set forth in claim 1 wherein said means for latching said actuating rod and said sleeve comprises spaced notches on said rod, a first member housed in said sleeve, a spring urging said member toward said notches, said bushing having an axial groove therein, a locking member positioned in said sleeve on the side of said spring remote from said first member cooperating with said groove, whereby axial motion of said actuating rod is interdicted for any other than a specified orientation thereof in which said locking member engages with said groove.

References Cited by the Examiner

UNITED STATES PATENTS

| | | | |
|---|---|---|---|
| 2,567,571 | 9/1951 | Merriman | 74—503 |
| 2,847,871 | 8/1958 | Schick | 74—477 |

MILTON KAUFMAN, *Primary Examiner.*